United States Patent
Kim et al.

(10) Patent No.: US 8,340,947 B2
(45) Date of Patent: Dec. 25, 2012

(54) SINGLE QUANTIFICATION METHOD OF EXTERNAL EVENT PSA MODEL CONTAINING MULTI-COMPARTMENT PROPAGATION SCENARIOS

(75) Inventors: Kil Yoo Kim, Daejeon (KR); Yoon Hwan Lee, Daejeon (KR); Joon Eon Yang, Daejeon (KR); Mee Jeong Hwang, Daejeon (KR); Woo Sik Jung, Daejeon (KR)

(73) Assignees: Korean Atomic Energy Research Institute, Daejon (KR); Korea Hydro & Nuclear Power, Seoul (KR)

( * ) Notice: Subject to any disclaimer, the term of this patent is extended or adjusted under 35 U.S.C. 154(b) by 501 days.

(21) Appl. No.: 12/356,363

(22) Filed: Jan. 20, 2009

(65) Prior Publication Data

US 2010/0082318 A1    Apr. 1, 2010

(30) Foreign Application Priority Data

Sep. 29, 2008    (KR) .................. 10-2008-0095535

(51) Int. Cl.
*G06G 7/48* (2006.01)
(52) U.S. Cl. ............................................ 703/6; 703/2
(58) Field of Classification Search .................. 703/2, 6
See application file for complete search history.

(56) References Cited

OTHER PUBLICATIONS

Zhang et al. "Analysis of Nuclear Power Plants Involving Failure-Correlation of Subsystems Caused by Earthquake." Aug. 2001.*
Vinod et al. "Insights from fire PSA for enhancing NPP safety" ELSEVIER Jan. 2008.*
Julius et al. "A procedure for the analysis of errors of commission in a Probabilistic Safety Assessment of a nuclear power plant at full power" ELSEVIER 1995.*

* cited by examiner

*Primary Examiner* — Saif Alhija
(74) *Attorney, Agent, or Firm* — Christensen O'Connor Johnson Kindness PLLC

(57) ABSTRACT

Provided is a single quantification method of an external event PSA model containing multi-compartment scenarios, including: loading an internal event PSA logic model having core damage as a top event; constituting a mapping table comprising external events containing the multi-compartment scenarios in consideration of information regarding external event occurrence frequencies, external event-induced initiators, and equipments damaged by external events; reflecting the mapping table in the internal event PSA logic model to establish an external event PSA model; calculating a final minimum cut set (MCS) based on the external event PSA model; and calculating a core damage frequency (CDF) value according to the final MCS.

7 Claims, 3 Drawing Sheets

SINGLE QUANTIFICATION METHOD OF EXTERNAL EVENT PSA MODEL CONTAINING MULTI-COMPARTMENT PROPAGATION SCENARIOS

CROSS-REFERENCE TO RELATED PATENT APPLICATION

This application claims the benefit of Korean Patent Application No. 10-2008-0095535, filed on Sep. 29, 2008, in the Korean Intellectual Property Office, the disclosure of which is incorporated herein in its entirety by reference.

BACKGROUND OF THE INVENTION

1. Field of the Invention

The present invention relates to a method of quantifying an external event core damage frequency (CDF) assessment of a nuclear power plant, and more particularly, to a single quantification method of an external event probabilistic safety assessment (PSA) model containing multi-compartment propagation scenarios by which an external event CDF assessment is quantified in consideration of external events occurring in single compartments and external events spreading to adjacent compartments.

2. Description of the Related Art

A nuclear power plant is divided into 200 or more compartments so as to be managed. Also, quantifications of 200 or more times should be performed on 200 or more compartments in order to quantify core damage frequencies (CDFs) which may be induced by damages to equipments installed in 200 or more compartments. In addition, a fault tree is changed whenever an external event quantification is performed in each of the compartments.

In order to solve this problem, a simple method of processing and quantifying data is disclosed in Korea Patent Application No. 2007-28638 applied by the present applicant.

In the above simple method, compartment information of a nuclear power plant, an event occurrence frequency in each compartment, other parameters, and information regarding equipments and related cables that may be damaged when events occur are input in order to generate a mapping table. An external event fault tree is formed based on the mapping table in order to perform quantifications at a time regardless of the number of target compartments which are to be analyzed.

However, in the above simple method, simultaneous quantifications are performed on external events in single compartments, but external events propagated to adjacent compartments are not considered at all. The propagations of external events to adjacent compartments are very important factors in a fire PSA, a flood PSA, and the like. Compartments, such as a switch gear compartment and the like, having an important effect on the safety of a nuclear power plant, are required to be analyzed in consideration of the propagations of external events to a corridor and adjacent compartments.

SUMMARY OF THE INVENTION

The present invention provides a single quantification method of an external event probabilistic safety assessment (PSA) model containing multi-compartment propagation scenarios by which external event core damage frequencies (CDFs) are quantified at a time in consideration of external events occurring in single compartments and external events propagated to adjacent compartments.

According to an aspect of the present invention, there is provided A single quantification method of an external event PSA model containing multi-compartment scenarios, including: loading an internal event PSA logic model having core damage as a top event; constituting a mapping table comprising external events containing the multi-compartment scenarios in consideration of information regarding external event occurrence frequencies, external event-induced initiators, and equipments damaged by external events; reflecting the mapping table in the internal event PSA logic model to establish an external event PSA model; calculating a final minimum cut set (MCS) based on the external event PSA model; and calculating a core damage frequency (CDF) value according to the final MCS.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments of the present invention will now be described in detail with reference to the attached drawings.

A single quantification method of an external event probabilistic safety assessment (PSA) model according to the present invention may be variously applied to quantify a core damage frequency (CDF) which is induced by an external event such as earthquake, fire, or flood. A single quantification method for a fire PSA of a fire event occurring in each compartment will be described in the present specification.

Figure 1:
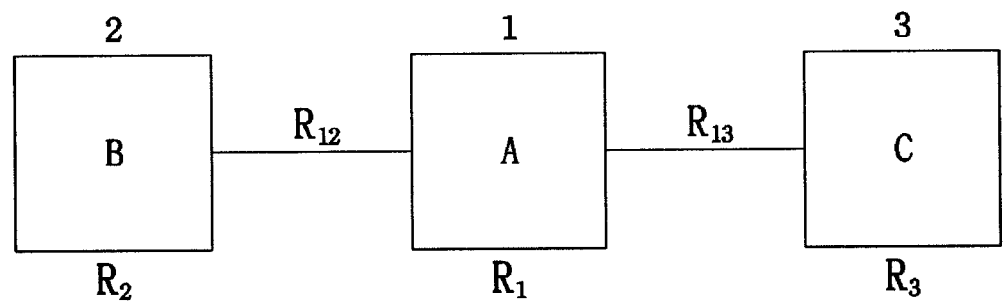
FIG. 1 illustrates structures of fire compartments and equipments in a virtual nuclear power plant according to an embodiment of the present invention.
Figure 2:
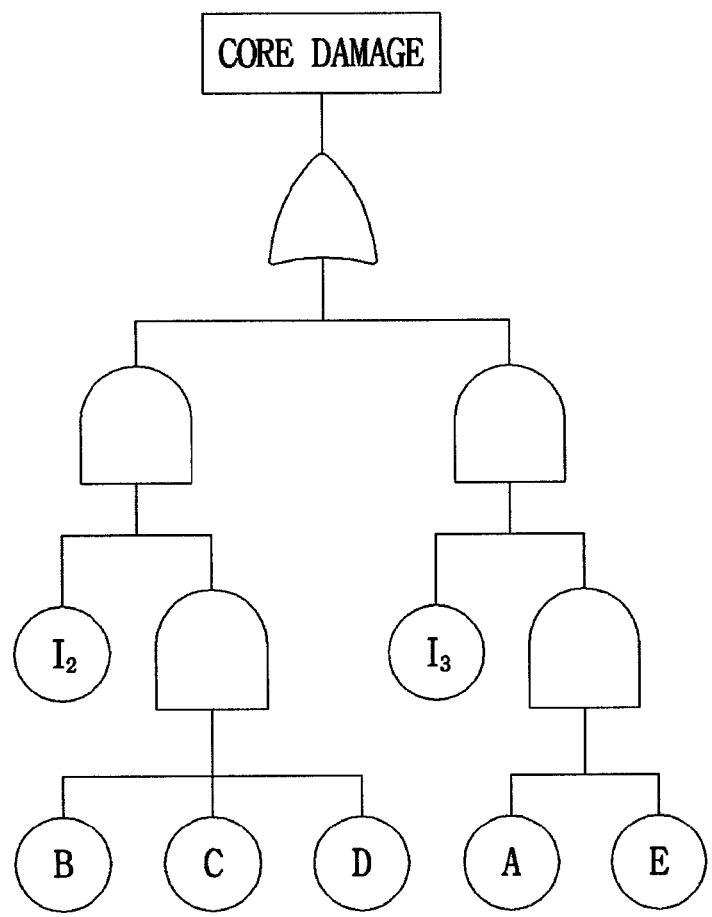
FIG. 2 illustrates an initial internal event probabilistic safety assessment (PSA) model that induces core damage to a virtual nuclear power plant according to an embodiment of the present invention.

FIG. 1 illustrates structures of fire compartments and equipments in a virtual nuclear power plant according to an embodiment of the present invention. FIG. 2 illustrates an initial internal event PSA model which may induce core damage to a virtual nuclear power plant according to an embodiment of the present invention.

As shown in FIG. 1, a virtual nuclear power plant includes first, second, and third fire compartments, and equipments "A," "B," and "C" are respectively installed in the first, second, and third fire compartments. Five fire events "$R_1$," "$R_2$," "$R_3$," "$R_{12}$," and "$R_{13}$" may occur. Here, the fire events "$R_1$," "$R_2$," and "$R_3$" refer to single compartment fire events which respectively occur in the first, second, and third compartments, and the fire events "$R_{12}$" and "$R_{13}$" refer to multi-compartment fire events which starts at related compartments and spread to adjacent compartments. Here, reference characters denote the following meanings.

A, B, C, D, and E=Basic Events or Equipments
$I_i$=Initiator of Internal Event PSA
$R_i$=Singe Compartment Fire at the $i^{th}$ Compartment $R_{ij}$=Multi-compartment Fire that Starts at the $i^{th}$ Compartment and Spreads to the Adjacent $j^{th}$ Compartment
where "$I_i$," "$R_i$," and "$R_{ij}$" have frequency units and their AND logic combinations in a Boolean Equation result in empty sets.

In the present embodiment, the following conditions are postulated in order to model fire-induced initiators.

1) The fire events "$R_1$," "$R_2$," and "$R_{12}$" induce an internal initiator "$I_2$."

2) The fire events "$R_3$" and "$R_{13}$" induce an internal initiator "$I_3$."

As shown in FIG. 2, for an easier explanation of fire quantification methods, it is assumed that the hypothetical nuclear power plant has an internal event PSA logic model as:

$$I_2BCD+I_3AE$$

where "A," "B," "C," "D," and "E" denote basic events, and "$I_2$" and "$I_3$" denote internal event PSA initiators. Internal event PSA logic models are respectively positioned as top events in a fault tree which is stored in a PSA combination database (DB).

The internal event PSA logic model of FIG. 2 is mapped with the fire events based on relations between the fire events and the fire-induced initiators and the first, second, and third compartments and the equipments shown in FIG. 1 in order to write a mapping table shown in Table 1 below.

TABLE 1

| Fire Event | Basic Event and Initiator |
|---|---|
| $R_1$ | A, $I_2$ |
| $R_2$ | B, $I_2$ |
| $R_3$ | C, $I_3$ |
| $R_{12}$ | A, B, $I_2$ |
| $R_{13}$ | A, C, $I_3$ |

A single quantification method of an external event PSA model containing multi-compartment scenarios according to an embodiment of the present invention will now be described in detail based on the internal event PSA logic model of FIG. 2 with reference to FIG. 3.

Figure 3:
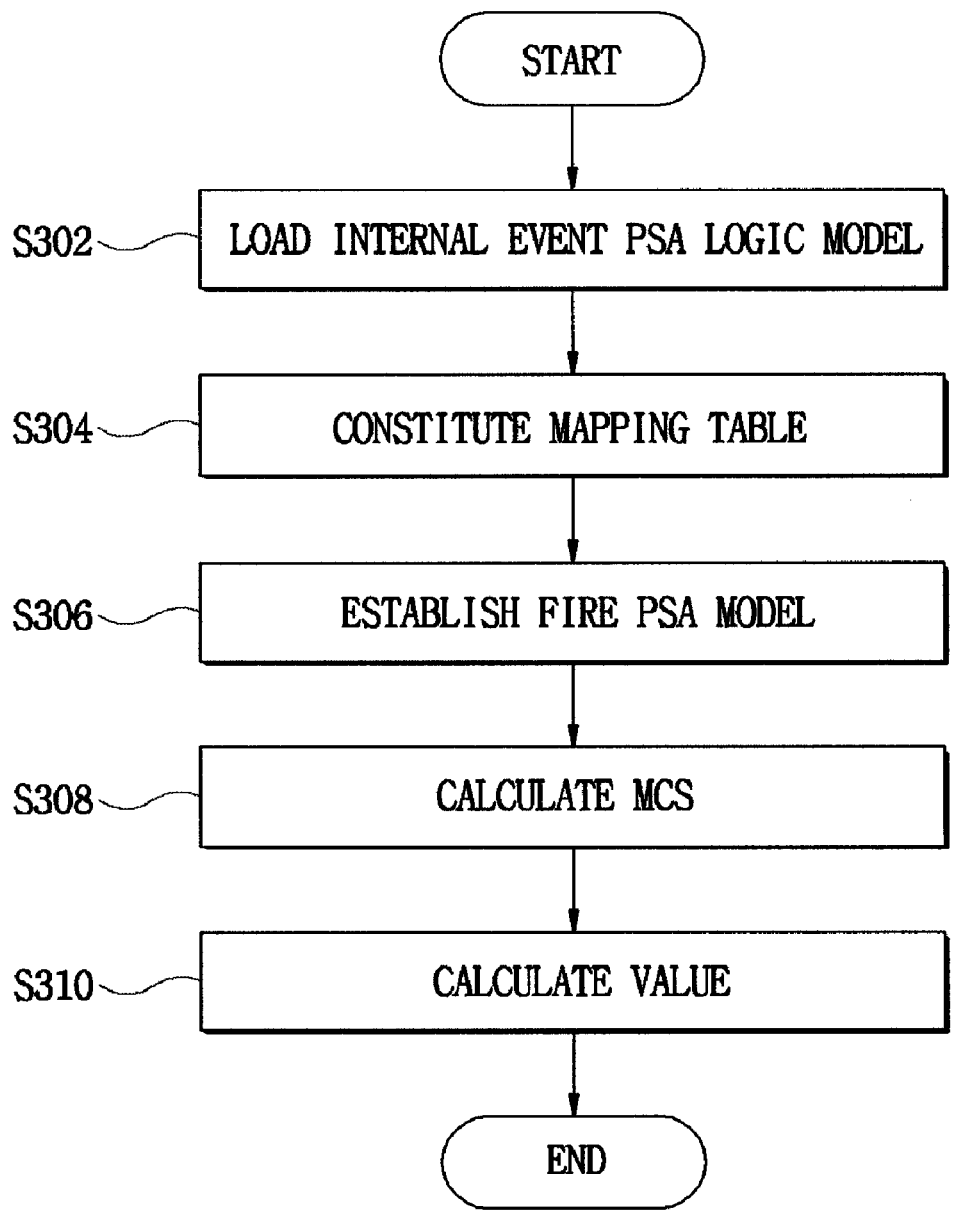
FIG. 3 is a flowchart of a single quantification method of an external event PSA model containing multi-compartment propagation scenarios according to an embodiment of the present invention.
Figure 4:
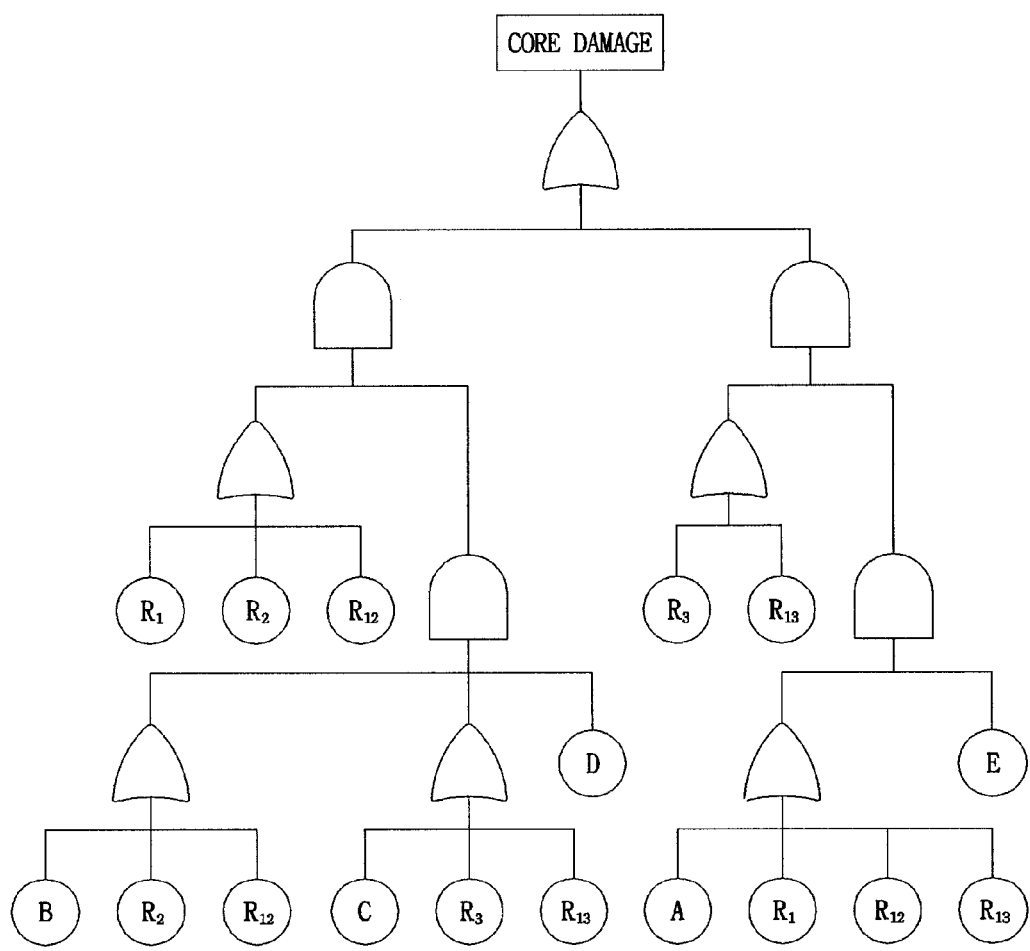
FIG. 4 illustrates a fire PSA model according to an embodiment of the present invention.

FIG. 3 is a flowchart of a single quantification method of an external event PSA model containing multi-compartment scenarios according to an embodiment of the present invention. FIG. 4 illustrates a fire PSA model according to an embodiment of the present invention.

In operation S302, an internal event PSA model having core damage as a top event is loaded from a PSA combination DB.

In operation S304, a mapping table of fire events, which may occur, is constituted in consideration of fire event occurrence frequencies, fire-induced initiators, equipments damaged by fires, etc. Here, the fire events considered to constitute the mapping table include single fire events occurring in single compartments and fire events spreading to adjacent compartments.

In operation S306, an effect of a fire event is reflected in the internal event PSA logic model using the mapping table in order to establish a fire PSA model.

Operation S306 include: replacing an initiator "$I_i$" of the internal event PSA logic model with OR logic operation of related fire events "$R_i$"; and performing OR logic operation on a basic event of an equipment damaged by a fire among basic events of the internal event PSA logic model in order to add a fire event "$R_i$," which makes the equipment unusable, to the basic event.

In other words, the single fire events in the single compartments and the fire events spreading to the adjacent compartments, which are included in the mapping table, are combined according to the above-mentioned rules. The fire events are also substituted into the internal event PSA logic model of FIG. 2 in order to generate a fire PSA model shown in FIG. 4.

$$A \to A+R_1+R_{12}+R_{13}$$

$$B \to B+R_2+R_{12}$$

$$C \to C+R_3+R_{13}$$

$$I_2 \to R_1+R_2+R_{12}$$

$$I_3 \to R_3+R_{13}$$

The equipment "A" is damaged by the failure of the equipment "A," the single fire event "$R_1$," and the spreading fire event "$R_{12}$" or "$R_{13}$." The equipment "B" is damaged by the failure of the equipment "B" and the single fire event "$R_2$" or the spreading fire event "$R_{12}$." The equipment "C" is damaged by the failure of the equipment "C" and the single fire event "$R_3$" or the spreading fire event "$R_{13}$." Also, the initiator "$I_2$" is induced by the single fire event "$R_1$" or "$R_2$" or the spreading fire event "$R_{13}$," and the initiator "$I_3$" is induced by the single fire event "$R_3$" or the spreading fire event "$R_{13}$."

In operation S308, a final minimal cut set (MCS) is calculated based on the fire PSA model of FIG. 4.

The fire PSA model of FIG. 4 is expressed with a Boolean equation "$(R_1+R_2+R_{12})(B+R_2+R_{12})(C+R_3+R_{13})D+(R_3+R_{13})(A+R_1+R_{12}+R_{13})E$." The final MCS inducing a top event, i.e., an event inducing core damage to a nuclear power plant, is calculated through the Boolean equation as below:

$$\begin{aligned}
&"(R_1 + R_2 + R_{12})(B + R_2 + R_{12})(C + R_3 + R_{13})D + \\
&\quad (R_3 + R_{13})(A + R_1 + R_{12} + R_{13})E = \\
&\quad (R_1B + R_2 + R_{12})(C + R_3 + R_{13})D + \\
&\quad (R_3A + R_{13})E = [(R_1BC + R_1R_3B + R_1R_{13}B + R_2C + \\
&\quad R_2R_3 + R_2R_{13} + R_{12}C + R_{12}R_3 + R_{12}R_{13})]D + \\
&\quad (R_3A + R_{13})E = [(R_1BC + R_2C + R_{12}C)]D + (R_3A + R_{13})E = \\
&\quad R_1BCD + R_2CD + R_{12}CD + R_3AE + R_{13}E"
\end{aligned}$$

where "$R_i$" and "$R_j$" have frequency units and their AND logic combination results in an empty set.

In other words, five event combinations may induce the core damage of the nuclear power plant. Here, the first event combination refers to a combination "$R_1BCD$" of the single fire event "$R_1$" and the failures of the equipments "B," "C," and "D." The second event combination refers to a combination "$R_2CD$" of the single fire event "$R_2$" and the failures of the equipments "C" and "D." The third event combination refers to a combination "$R_{12}CD$" of the spreading fire event "$R_{12}$" and the failures of the equipments "C" and "D." The fourth event combination refers to a combination "$R_3AE$" of the single fire event "$R_3$" and the failures of the equipments "A" and "E." The fifth event combination refers to a combination "$R_{13}E$" of the spreading fire event "$R_{13}$" and the failure of the equipment "E."

In operation S310, values of fire occurrence frequencies of the compartments, failure probabilities of the equipments, and the like are read from the PSA combination DB and then substituted into five final MCSs, which may induce the core damage, in order to calculate CDF values of the five final MCSs.

The PSA combination DB stores PSA basic data including the internal event PSA logic models, which are respectively positioned as top events in the fault tree, external event occurrence frequencies of the compartments, and the failure probabilities of the equipments. The PSA combination DB provides all input items necessary for PSA so as to further easily perform PSA.

Accordingly, quantifications can be performed at a time in consideration of external events occurring in single compartments in relation to top events, i.e., events inducing core damage to a nuclear power plant, and external events spreading to adjacent compartments.

As described above, in a single quantification method of an external event PSA model containing multi-compartment scenarios according to the present invention, only one-time quantification can be performed in relation to a top event, i.e., an event inducting core damage to a nuclear power plant, regardless of the number of target compartments to be analyzed. Thus, time and cost can be saved, and simultaneous quantification can be performed in consideration of external events occurring in single compartments and external event spreading to adjacent compartments. As a result, accurate quantification results of compartments having important effects on the safety of the nuclear power plant can be rapidly and easily obtained. Also, quantifications for calculating CDFs induced by external events such as fire, seismic, and flooding events can be performed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A single quantification method of an external event probabilistic safety assessment (PSA) model containing multi-compartment scenarios using a computer system, comprising:
   loading an internal event PSA logic model having core damage as a top event from a database of the computer system;
   using the computer system to constitute a maping table between internal events and external events containing the multi-compartment scnarios based on information of occurring frequencies of external events, initiators induced by external events, and equipment damaged by external events;
   establishing an external event PSA model, wherein establishing an external event PSA model comprises:
      replacing the initiators, wherein the computer system replaces the initiators of the internal event PSA lgic model with OR logics of related external events comprising single external events in single compartments and said single external events propagating to an adjacent compartment, by using the mapping table; and
      adding external events to the basic events, wherein the computer system performs OR logic operations on the basic events of equipment damage caused by external events, among the basic events of the internal event PSA logic model, and wherein the external events make the equipment unusable;
   calculating a final minimum cut set (MCS) based on the external event PSA model; and
   calculating a core damage frequency (CDF) value accorinng to the final MCS.

2. The single quantification method of claim 1, wherein the internal event PSA logic model having core damage as a top event is read by the computer system to be loaded from a PSA combination database (DB), which stores internal event PSA logic models according to top events in a fault tree.

3. the single quantification method of claim 1, wherein calculating a core damage frequency (CDF) value according to the final MCS comprises:
   inputting respective probability values into factors of the final MCS, wherein the computer system reads the respective probability values from the PSA combination DB which stores PSA basic data including external event occuring frequencies of the compartments and failure probabilities of the equiopment.

4. The single quetification method of claim 1, wherein the CDF value is a CDF value of one of fire, seismic, and flood events.

5. The single quantification method of claim 1, wherein the external events are one of fire, seismic, and flood events.

6. The single quantification method of claim 1, wherein the internal events are one of fire and flood events.

7. The single quantification method of claim 1, wherein the basic events are one of fire, flood, and equipmetn failure events.

* * * * *

UNITED STATES PATENT AND TRADEMARK OFFICE
CERTIFICATE OF CORRECTION

| | | Page 1 of 1 |
|---|---|---|
| PATENT NO. | : 8,340,947 B2 | |
| APPLICATION NO. | : 12/356363 | |
| DATED | : December 25, 2012 | |
| INVENTOR(S) | : Kim et al. | |

It is certified that error appears in the above-identified patent and that said Letters Patent is hereby corrected as shown below:

In the claims,

| COLUMN | LINE | ERROR |
|---|---|---|
| 5 (Claim 1, line 8) | 45 | "maping" should read --mapping-- |
| 5 (Claim 1, line 10) | 47 | "scnarios" should read --scenarios-- |
| 6 (Claim 1, line 17) | 7 | "lgic" should read --logic-- |
| 6 (Claim 3, line 1) | 27 | "the" should read --The-- |
| 6 (Claim 3, line 9) | 35 | "equiopment" should read --equipment-- |
| 6 (Claim 4, line 1) | 36 | "quetification" should read --quantification-- |

Signed and Sealed this
Ninth Day of February, 2016

Michelle K. Lee
*Director of the United States Patent and Trademark Office*